US011046260B2

(12) United States Patent
Sekino et al.

(10) Patent No.: US 11,046,260 B2
(45) Date of Patent: Jun. 29, 2021

(54) POWER-SUPPLYING DEVICE AND ASSEMBLY METHOD OF POWER-SUPPLYING DEVICE (71) Applicant: Yazaki Corporation, Tokyo (JP)

(72) Inventors: Tsukasa Sekino, Makinohara (JP); Hiroshi Yamashita, Makinohara (JP); Daisuke Okamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 465 days.

(21) Appl. No.: 15/067,813

(22) Filed: Mar. 11, 2016

(65) Prior Publication Data
US 2016/0244004 A1 Aug. 25, 2016

Related U.S. Application Data (63) Continuation of application No. PCT/JP2014/076683, filed on Oct. 6, 2014.

(30) Foreign Application Priority Data

Oct. 11, 2013 (JP) .............................. JP2013-214076

(51) Int. Cl.
B60R 16/02 (2006.01)
H01R 13/58 (2006.01)
(Continued)

(52) U.S. Cl.
CPC ........ B60R 16/0215 (2013.01); B60R 16/027 (2013.01); H01R 13/5841 (2013.01);
(Continued)

(58) Field of Classification Search
CPC .............. B60R 16/0215; B60R 16/027; B60R 16/0207; H02G 11/00; H01R 13/5841; H01R 13/562
(Continued)

(56) References Cited

U.S. PATENT DOCUMENTS 2,511,772 A * 6/1950 Finizie ................. H01R 13/562
439/11
5,145,388 A * 9/1992 Brownlie ............. H01R 4/5008
174/60
(Continued)

FOREIGN PATENT DOCUMENTS

JP 2007-151257 A 6/2007
JP 2010023757 A * 2/2010

OTHER PUBLICATIONS

International Search Report dated Dec. 9, 2014, issued for PCT/JP2014/076683.

Primary Examiner — Jonathan Liu
Assistant Examiner — Taylor L Morris
(74) Attorney, Agent, or Firm — Locke Lord LLP (57) ABSTRACT There is provided a power-supplying device and an assembly method thereof. By causing a first-turning member, which locks with an one end of a coil spring by a first-locking section, and a first support, which locks with the other end thereof by a second-locking section, to rotate relative to each other in the direction that is opposite to the biasing direction, and causing an engaging part and an engaged part to be in an engaged state by engaging with each other, thereby, maintaining the state where the initial biasing force is being imparted to the first turning member, is enabled, and the first support and a second support member are easily assembled to each other to make a turning member be supported, and thus, assembly properties can be made enhanced.

8 Claims, 6 Drawing Sheets (51) Int. Cl.
*H02G 11/00* (2006.01)
*B60R 16/027* (2006.01)
*B60R 16/03* (2006.01)

(52) U.S. Cl.
CPC .......... *H02G 11/00* (2013.01); *B60R 16/0207* (2013.01); *B60R 16/03* (2013.01); *H02G 11/006* (2013.01)

(58) Field of Classification Search
USPC ....................................................... 174/72 A
See application file for complete search history.

(56) References Cited

U.S. PATENT DOCUMENTS

| | | | | |
|---|---|---|---|---|
| 5,390,433 | A * | 2/1995 | Brady | D06F 75/28 219/256 |
| 5,453,585 | A * | 9/1995 | Lenz | H02G 11/02 191/12.2 R |
| 5,967,807 | A * | 10/1999 | Wu | H01R 29/00 439/131 |
| 6,027,352 | A * | 2/2000 | Byrne | H01R 13/562 439/215 |
| 6,220,889 | B1 * | 4/2001 | Ely | H01R 13/5841 439/310 |
| 6,321,489 | B1 * | 11/2001 | Murofushi | B60J 5/062 49/360 |
| 6,350,956 | B1 * | 2/2002 | Sakata | B60R 16/0215 16/221 |
| 6,358,073 | B1 * | 3/2002 | Jhanson | B60R 16/0207 439/164 |
| 6,406,314 | B1 * | 6/2002 | Byrne | H01R 25/164 439/215 |
| 6,475,021 | B1 * | 11/2002 | Tan | H01R 13/5841 439/446 |
| 6,659,782 | B2 * | 12/2003 | Wu | H01R 31/065 439/131 |
| 6,793,259 | B2 * | 9/2004 | Sano | B60J 5/06 296/155 |
| 7,005,973 | B2 * | 2/2006 | Haigh | G09F 21/04 116/28 R |
| 7,060,903 | B2 * | 6/2006 | Tsubaki | B60R 16/0215 174/70 R |
| 7,086,687 | B2 * | 8/2006 | Aoki | B60R 16/0215 296/155 |
| 7,284,785 | B2 * | 10/2007 | Gotou | H02G 3/0475 174/72 A |
| 7,311,533 | B1 * | 12/2007 | Lin | H01R 13/5841 439/131 |
| 7,369,381 | B2 * | 5/2008 | Tsukamoto | B60R 16/0215 174/72 A |
| 7,482,538 | B2 * | 1/2009 | Kisu | B60R 16/0215 174/69 |
| 7,614,902 | B2 * | 11/2009 | Bayat | F21L 14/023 38/88 |
| 7,645,938 | B2 * | 1/2010 | Kogure | B60R 16/0215 174/72 A |
| 7,686,380 | B2 * | 3/2010 | Ochi | B60J 5/06 296/155 |
| 7,804,027 | B2 * | 9/2010 | Murayama | B60R 16/0215 174/480 |
| 7,811,136 | B1 * | 10/2010 | Hsieh | H01R 35/04 439/640 |
| 7,861,508 | B2 * | 1/2011 | Murayama | B60R 16/0215 114/364 |
| 7,980,518 | B2 * | 7/2011 | Katou | B60R 16/0215 174/525 |
| 7,984,605 | B2 * | 7/2011 | Pfeifer | F16G 13/16 174/72 A |
| 8,039,744 | B2 * | 10/2011 | Shimonishi | B60R 16/0215 174/72 C |
| 8,070,212 | B2 * | 12/2011 | Shima | B60R 16/0207 296/146.9 |
| 8,196,351 | B2 * | 6/2012 | Aoki | H02G 11/00 49/360 |
| 8,227,693 | B2 * | 7/2012 | Katou | H02G 11/003 174/68.1 |
| 8,242,366 | B2 * | 8/2012 | Katou | H02G 11/003 174/68.1 |
| 8,651,874 | B2 * | 2/2014 | Ku | H01R 35/02 439/31 |
| 9,397,460 | B2 * | 7/2016 | Zhou | H01R 35/025 |
| 9,929,496 | B1 * | 3/2018 | Weiden | H01R 13/5841 |
| 9,963,092 | B2 * | 5/2018 | Uno | B60R 16/02 |
| 2002/0005014 | A1 * | 1/2002 | Doshita | B60R 16/027 49/360 |
| 2007/0119610 | A1 | 5/2007 | Kisu et al. | |
| 2009/0140107 | A1 * | 6/2009 | Murayama | B60R 16/0215 248/60 |
| 2010/0089642 | A1 * | 4/2010 | Aoki | B60R 16/0215 174/72 A |
| 2010/0263926 | A1 * | 10/2010 | Murayama | B60R 16/0207 174/71 R |
| 2011/0114779 | A1 * | 5/2011 | Tsubaki | B60R 16/0215 242/372 |
| 2012/0028498 | A1 * | 2/2012 | Na | H01R 35/04 439/491 |
| 2013/0337662 | A1 * | 12/2013 | Lopez | F21V 23/06 439/11 |
| 2014/0299370 | A1 * | 10/2014 | Ikeda | B60R 16/027 174/72 A |
| 2014/0318860 | A1 * | 10/2014 | Kuji | H01R 13/639 174/72 A |
| 2015/0071590 | A1 * | 3/2015 | Wu | H01R 13/504 385/56 |
| 2015/0102182 | A1 * | 4/2015 | Sekino | B60R 16/0215 248/70 |
| 2016/0229360 | A1 * | 8/2016 | Iimuro | H02G 11/00 |
| 2016/0264076 | A1 * | 9/2016 | Kogure | B60R 16/027 |

* cited by examiner

POWER-SUPPLYING DEVICE AND ASSEMBLY METHOD OF POWER-SUPPLYING DEVICE

TECHNICAL FIELD

The present invention relates to a power-supplying device and an assembly method of the power-supplying device. The power-supplying device is composed of a support affixed to a sliding door or a vehicle body, a turning member pivotally supported by the support and into which a wire harness is being inserted, and a coil spring biasing the turning member in a predetermined rotation direction.

BACKGROUND ART

Conventionally, it has been proposed that a power-supplying device composed of a support that is to be affixed to a sliding door (slide-structure body), a turning member pivotally supported by the support and into which a wire harness is inserted, and a biasing member (coil spring) biasing the turning member in a predetermined rotation direction (refer to PTL 1, for example). The power-supplying device as described in PTL 1 is configured such that the biasing member biases the turning member so as to bend the wire harness in a predetermined direction while the sliding door is being opened and closed.

CITATION LIST

Patent Literatures

Patent Literature 1: JP 2007-151257A

SUMMARY OF INVENTION

Technical Problem

Nonetheless, in regard to the power-supplying device as described in PTL 1, there has been a concern that an operation of its assembly is made difficult because its assembly work needs to be assembled by applying a counterforce against an initial biasing force of the coil spring when applying the biasing force (an initial biasing force) to the coil spring so as to make the turning member be supported by the support while the sliding door is being in a full-closed state where the turning member has been rotated towards the biasing direction to a maximal degree.

The present invention aims to provide a power-supplying device and an assembly method of the power-supplying device by which the assembly workability can be enhanced while making the turning member be supported by the support along with applying an initial biasing force to a coil spring.

Solution to Problem

One aspect of the present invention provides a power-supplying device including: a support that is to be affixed to the sliding door or the vehicle body; a turning member pivotally supported by the support and into which a wire harness is inserted; and a coil spring adapted to biasing the turning member in a predetermined rotation direction, wherein the turning member includes a primary shaft protruding to an one side of an axial direction, a secondary shaft formed at the other side thereof, a first-locking section adapted to be locked with a first end of the coil spring at the one side of the axial direction, and an engaged part that is to be engaged with the support, wherein the support includes a first support supporting the primary shaft and housing the coil spring, and a second support affixed to the first support and supporting the secondary shaft, wherein the first support includes a second-locking section to be locked with a second end of the coil spring and an engaging part to be engaged with the engaged part, wherein by making the first support and the turning member be relatively moved in an direction that is opposite to the biasing direction of the coil spring from a neutral condition where the primary shaft is supported by the first support, the first end of the coil spring is locked with the first-locking section and the second end thereof is locked with the second-locking section, an engaging condition where the coil spring is elastically deformed and the engaging part and the engaged part are engaged with each other, is established, and wherein in the engaging condition where the turning member's rotation towards the biasing direction is restricted, the first support and the second support are made assembled to each other.

According to the one aspect of the present invention as the above, by making the first support and the turning member be relatively moved in an direction that is opposite to the biasing direction of the coil spring so that the engaging condition is established, the state where the initial biasing force is being imparted to the coil spring can be maintained, and thereby, the first support and the second support can be easily assembled to each other so that the turning member is enabled to be supported thereby.

At this time, in the power-supplying device of the present invention, it is preferable that the power-supplying device as defined in the one aspect of the present invention, wherein the turning member is composed of a first-turning member including the primary shaft, the first-locking section, and the engaged portion, and a second-turning member including the secondary shaft.

According to such a configuration, the first-turning member and the second-turning member are provided individually to each other, the first-turning member is made supported by the first support, and thereafter the second-turning member can be assembled thereto. For example, the first-turning member into which a wire harness is avoided to be inserted can be selectively supported by the first support so that the engaging condition is established. Thereafter, the first-turning member and the second-turning member are made assembled to each other with having the wire harness be inserted thereinto. Accordingly, the assembly workability can be made furtherly enhanced.

Furthermore, the power-supplying device in the present invention preferably includes the power-supplying device as defined in the one aspect of the present invention, wherein the second support includes a restriction portion that restricts a rotational movement in a direction that is opposite to the biasing direction of the turning member so as not to rotate to or beyond a predetermined rotation position. According to such a configuration, by providing the restriction portion, the working range of the wire harness in a direction that is opposite to the biasing direction can be restricted. Further, the restriction portion is provided at the second support, thereby, it can be prevented that the restriction portion becomes to be an impediment when the first-turning member is being supported by the first support so that the engaging condition is changed from the neutral condition.

Further, in the power-supplying device in the present invention, it is preferable that the first-locking section and the engaged part are respectively formed at an one side and an other side of a projection portion that protrudes radially and outwardly with respect to the turning member. According to such a configuration, by forming the first-locking section and the engaged part at the one side and the other side of the projection portion in a separate manner, the configuration of the turning member can be thus made simplified.

On the other hand, the assembly method of the power-supplying device of the present invention provides an assembly method of the power-supplying device as defined in any one of precedent aspects of the present invention, wherein the engaging condition is established by a relative movement of the first support with respect to the turning member in a direction that is opposite to the biasing direction from the neutral condition, and wherein in the engaging condition, the wire harness is assembled to the turning member, and subsequently, the first support and the second support are assembled to each other, and the secondary shaft is made supported by the second support. According to such an assembly method of the power-supplying device of the present invention, as aforementioned, the power-supplying device in which the initial biasing force is being imparted to the coil spring can be assembled with ease.

Advantageous Effects of Invention

According to the power-supplying device and the assemble method of the power-supplying device as afore-described, the first support including the engaging part and the first-turning member including the engaged part are relatively moved in the opposite direction to the biasing direction so that the engaging condition is established, the assembly workability can be made enhanced when the initial biasing force is being imparted to the coil spring so that the turning member is made supported by the support.

DESCRIPTION OF EMBODIMENTS

Figure 1:
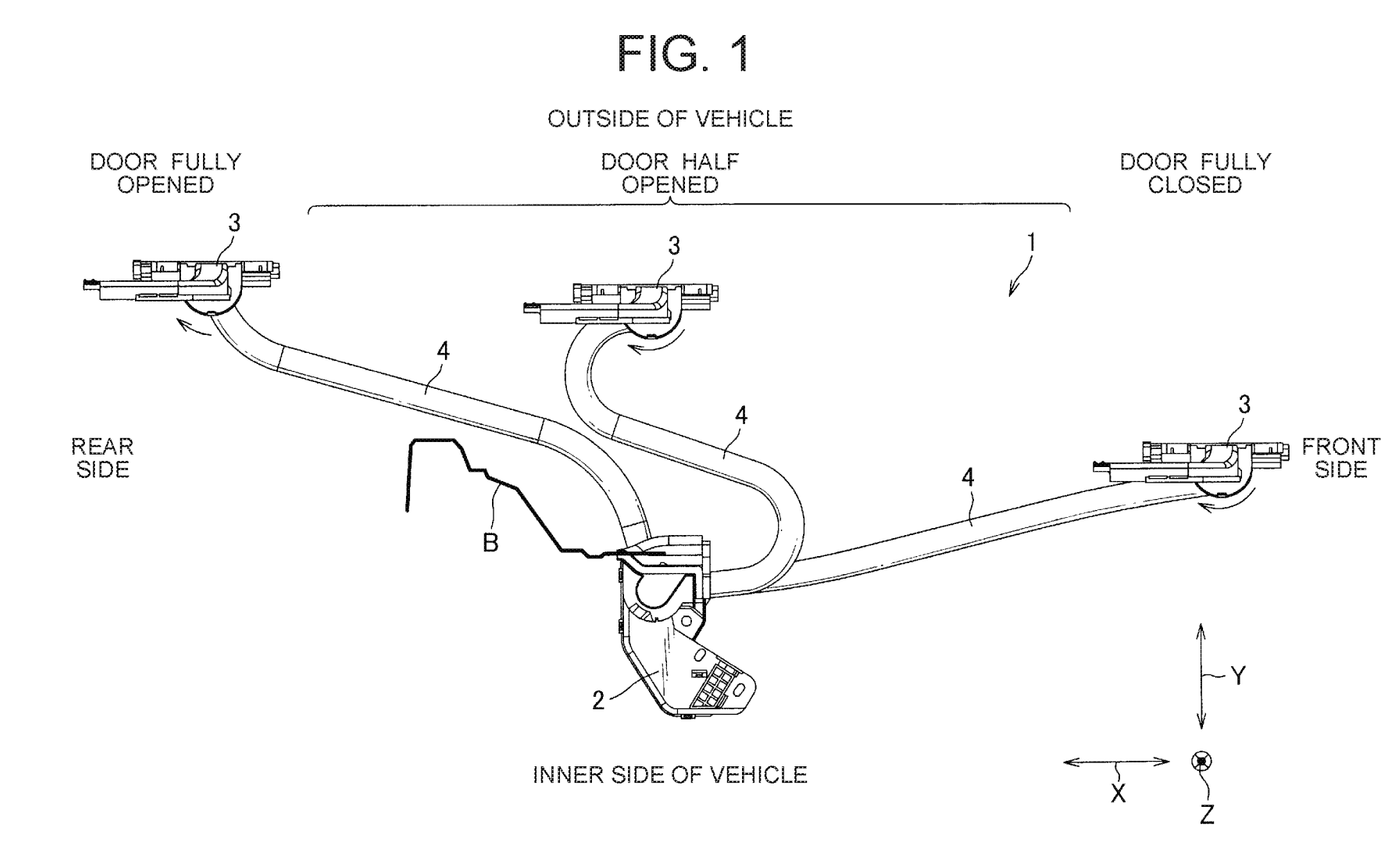
FIG. 1 is a plan view showing an operation of a power-supplying device in an one embodiment of the present invention.

Hereinafter, an embodiment of the present invention is described with reference to the drawings. A power-supplying device 1 of this embodiment is, as shown in FIG. 1, a device that is provided in a not-shown motor vehicle. The power-supplying device 1 is composed of the body-side unit 2 provided at a motor vehicle body B side, a door-side unit 3 provided at a not-shown sliding door as a slide-structure body, and a corrugate tube (an external member) 4 provided from the body-side unit 2 to the door-side unit 3 and into which a wire harness 41 as shown in FIG. 4 is inserted. The power-supplying device 1 constitutes a device which is designed to supply electrical power and to send and receive electric signals to not-shown electric appliances provided at the sliding door from not-shown power source or controller provided at a motor vehicle body B via the wire harness 41. Further, the X-direction, the Y-direction, and the Z-direction used in this embodiment are defined as shown in FIG. 1. The body-side unit 2 and the door-side unit 3 are designed to support the corrugate tube 4 in a freely rotative manner with defining the Z-direction for a vertical direction of the motor vehicle, as an axial direction, and the sliding door is made opened and closed in the X-direction corresponding to a front and rear direction of the motor vehicle.

Figure 2:
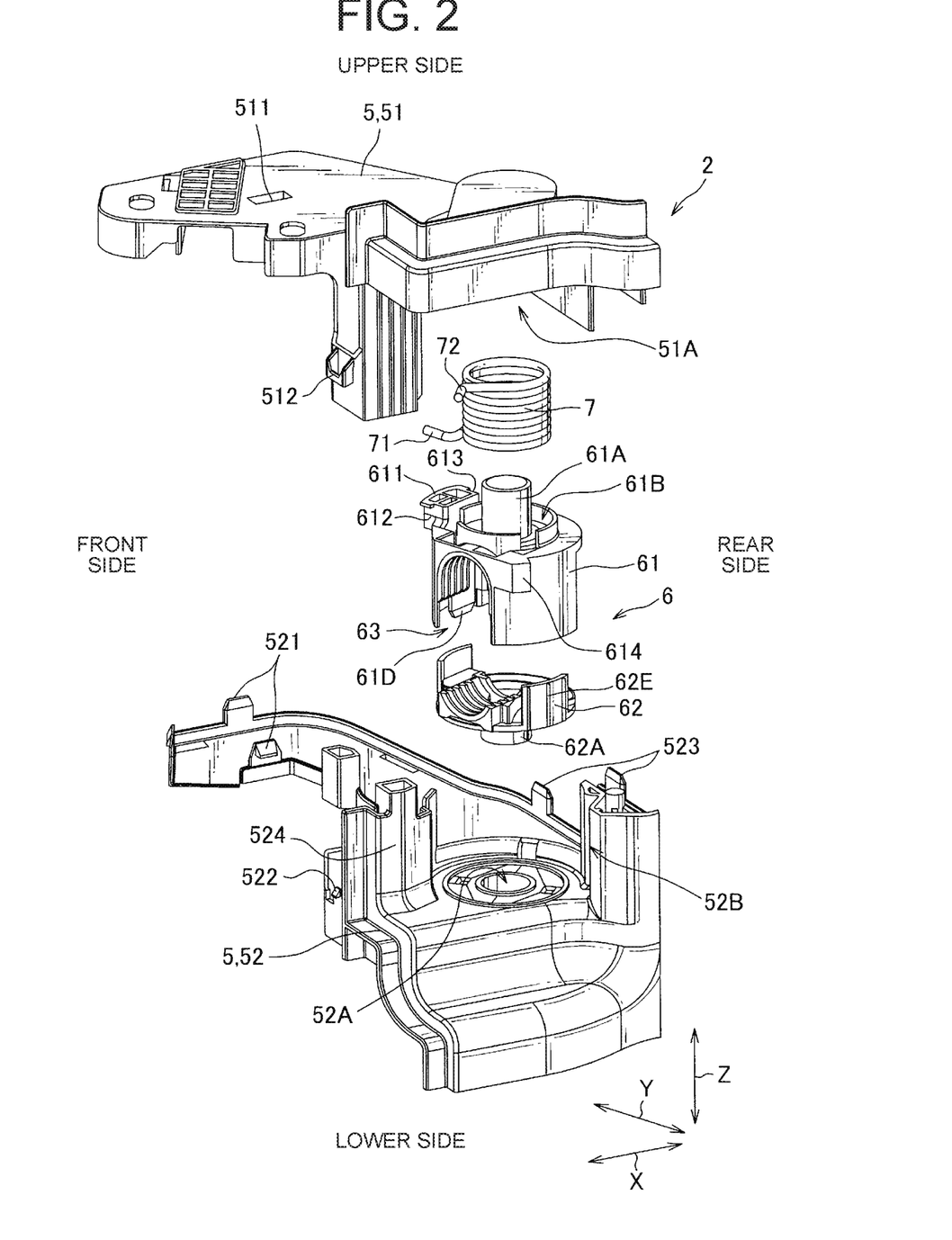
FIG. 2 is an exploded perspective view showing a main part of the power-supplying device.

The body-side unit 2 is composed of, as shown in FIG. 2, a support 5 that is to be affixed to the motor vehicle body B, a turning member 6 pivotally supported by the support 5 and into which the wire harness 41 is inserted, and a coil spring 7 designed to bias the turning member 6 in a predetermined rotation direction (shown by the arrow in FIG. 1).

The turning member 6 is composed of a first-turning member 61 including a primary shaft 61A protruding upwardly in the Z-direction and a second-turning member 62 including a secondary shaft 62A protruding downwardly in the Z-direction. In the first-turning member 61, there is formed a projection portion 611 protruding radially and outwardly with respect to the primary shaft 61A. The projection portion 611 is provided with a first-locking section 612 that is to be locked with the first end 71 of the coil spring 7, the first-locking section 612 formed forwardly in the X-direction, and an engaged part 613 formed rearwardly in the X-direction. Further, in the first-turning member 61, there are formed a restricted portion 614 that is radially and outwardly protruding, and a concaved portion 61B for housing the coil spring 7 in the upward position in the Z-direction. The first-turning member 61 and the second-turning member 62 are assembled to each other so that an insertion portion 63 opening in a direction in parallel to the X-Y plane and into which the corrugate tube 4 is to be inserted, is formed.

Figure 6A:
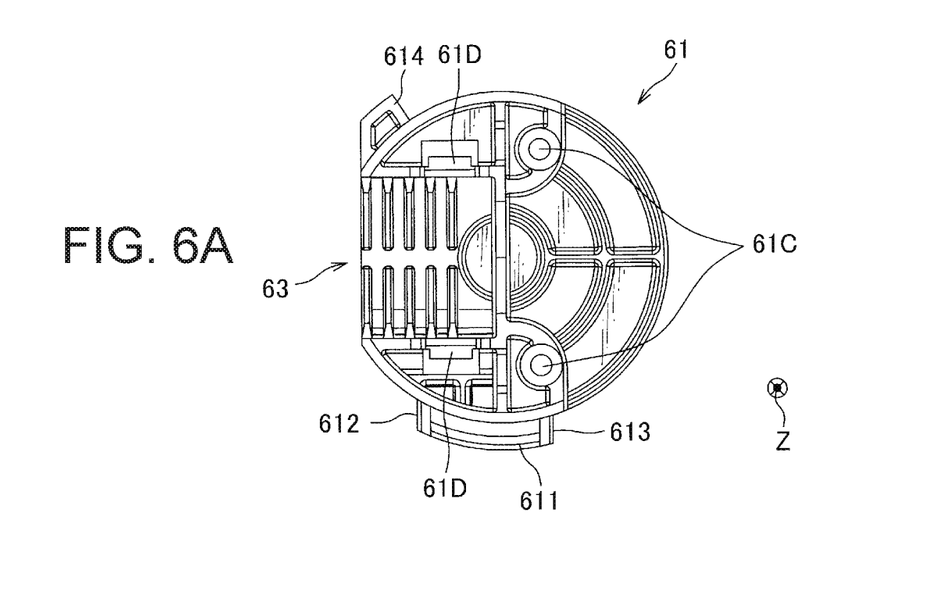
FIGS. 6A and 6B are plan views showing a main part of the power-supplying device.
Figure 6B:
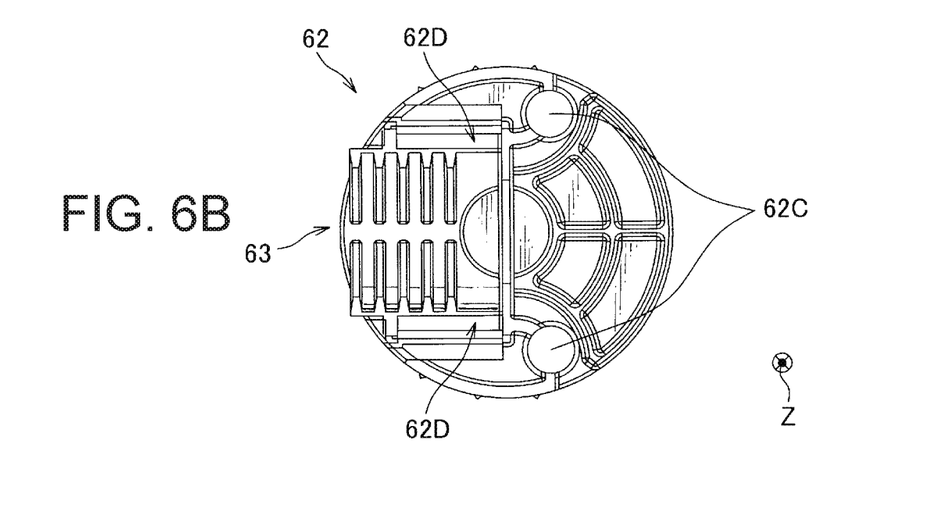

As shown also in FIG. 6, there are formed in the first-turning member 61, a boss 61C and a protruding piece 61D protruding downwardly. There are formed in the second-turning member 62, a boss-receiving hole 62C into which the boss 61C is inserted, a protruding-piece-receiving portion 62D that is to be engaged with the protruding piece 61D, and thereby, the relative movement of the first-turning member 61 with respect to the second-turning member 62 is prevented. Furthermore, the second-turning member 62 is provided with a lib 62E protruding radially and outwardly, and the first-turning member 61 is provided with a not-shown lib-receiving groove into which the lib 62E is to be inserted, is formed in the first-turning member 61. Thereby, the relative movement of the first-turning member 61 with respect to the second-turning member 62 is furtherly prevented.

Figure 3A:
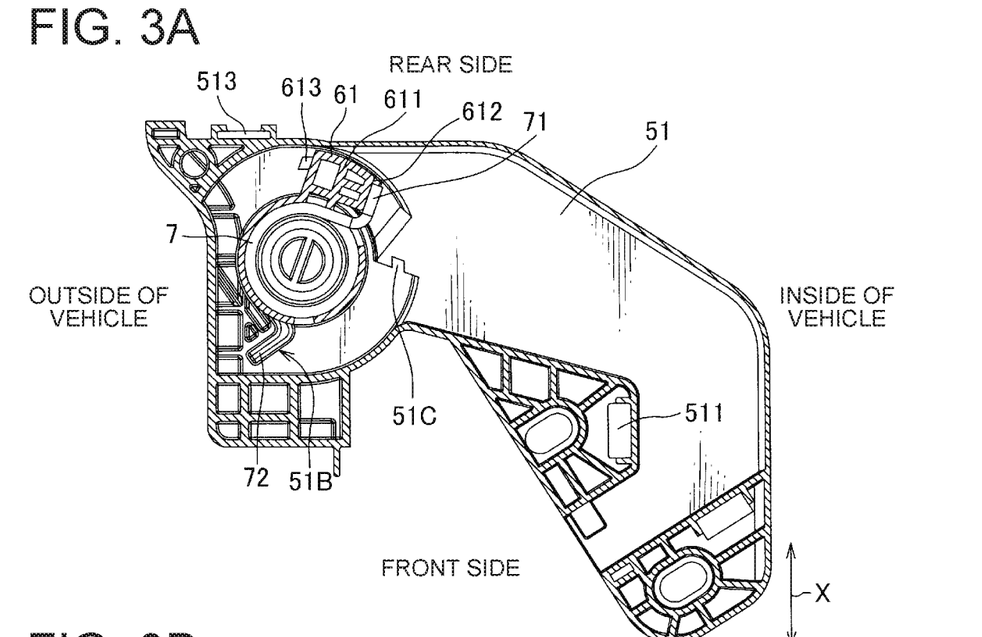
FIGS. 3A and 3B are partial sectional views showing a main part of the power-supplying device.
Figure 3B:
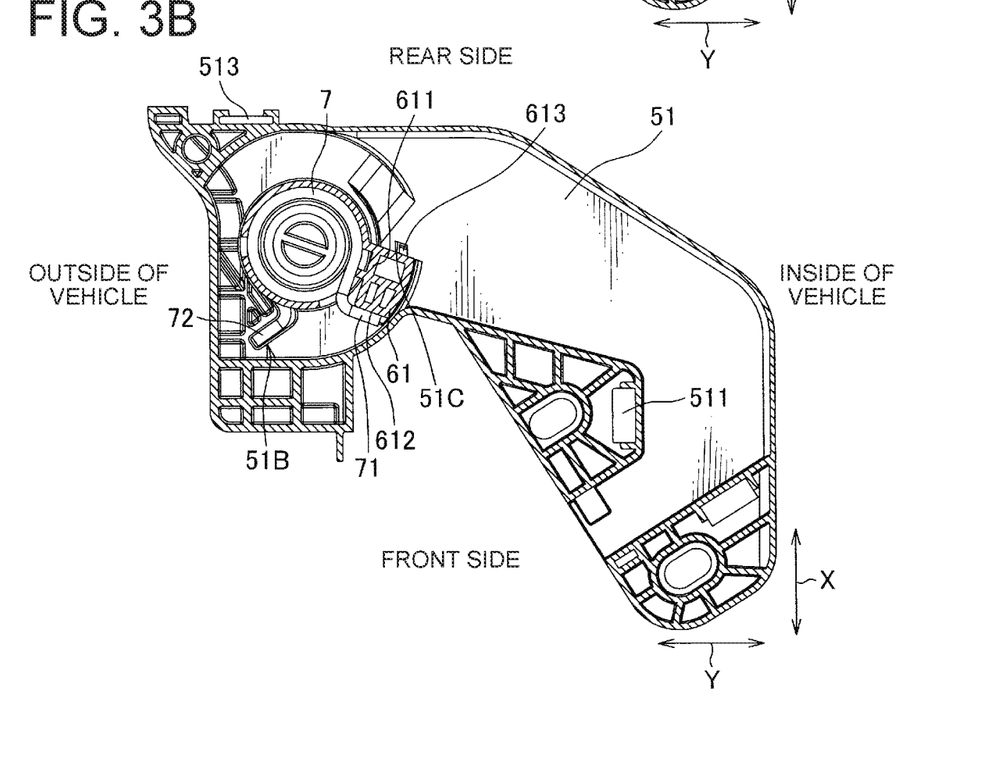
Figure 4A:
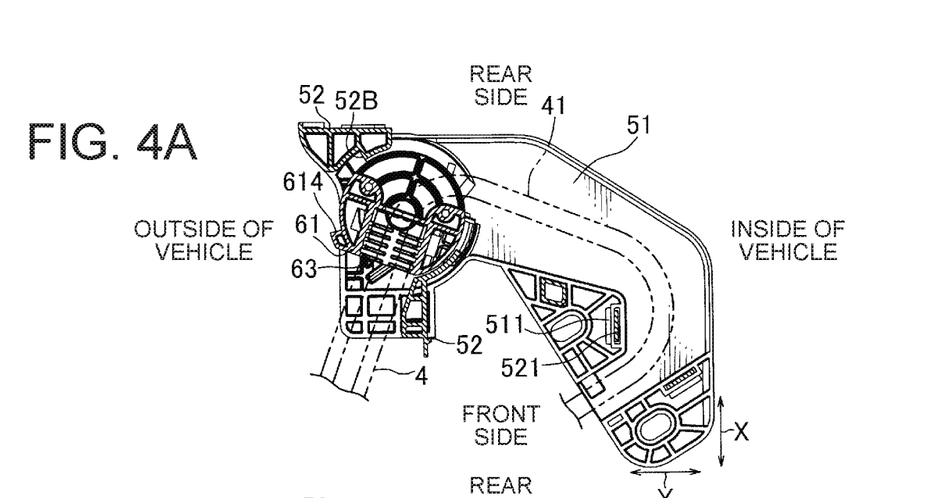
FIGS. 4A, 4B and 4C are partial sectional views showing a main part of the power-supplying device.
Figure 4B:
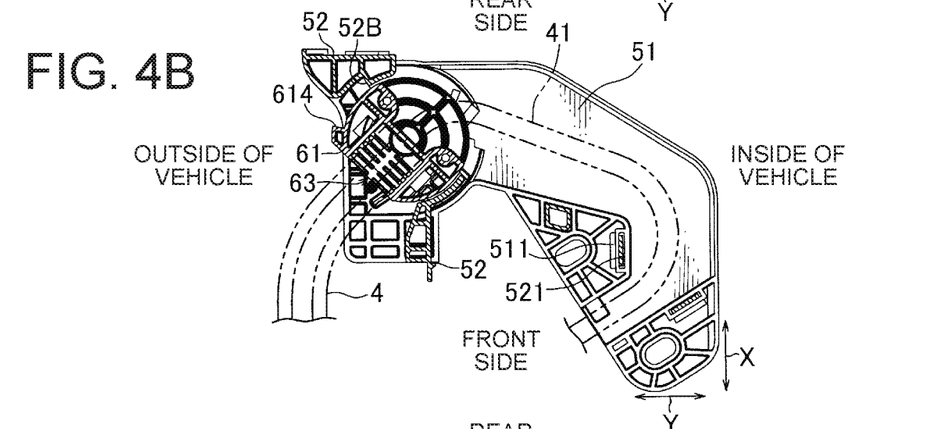
Figure 4C:
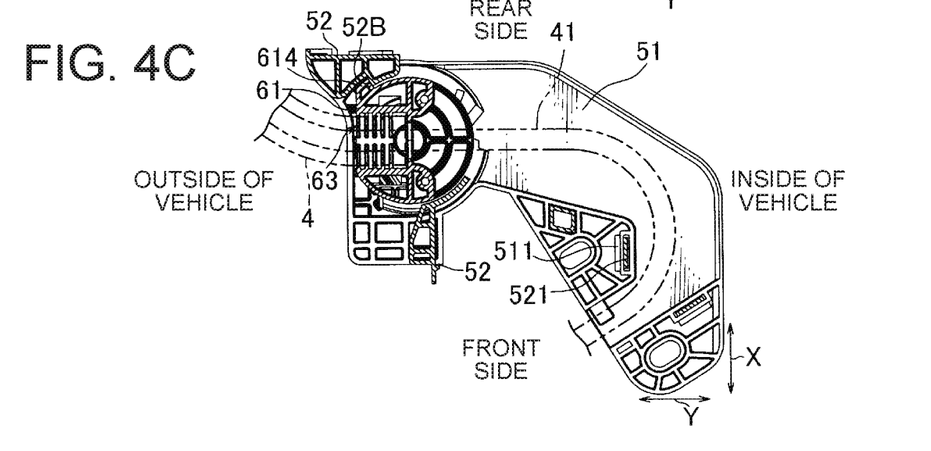

The support 5 is composed of a first support 51 supporting the primary shaft 61A by a first-shaft-receiving portion 51A and a second support 52 supporting the secondary shaft 62A by a second shaft receiving portion 52A, the second support 52 is affixed to the motor vehicle body B. The engagement holes 511, 512, 513 (refer to FIG. 3) formed in the first support 51 and the engagement protrusions 521, 522, 523 formed in the second support 52 engage with each other so that the first support 51 and the second support 52 are assembled to each other. There are formed in the first support 51, as shown in FIGS. 3 and 4, a second-locking section 51B that is to be locked with a second end 72 of the coil spring 7 and an engaging part 51C that is to be engaged with the engaged part 613.

The wire harness 41 is designed to extend along the upper surface of the second support 52 from the power source or the controller at a side closer to the motor vehicle body B than the turning member 6, and is inserted into the corrugate tube 4 at a side closer to the sliding door than the turning member 6. Thereby, the corrugate tube 4 is retained by the insertion portion 63.

Next, the assembly process of the body-side unit 2 is described. FIG. 3 is a partial sectional view showing that the coil spring 7 is housed within the first-turning member 61 and the primary shaft 61A is inserted into the first-shaft-receiving portion 51A. First, as shown in FIG. 3A, the first-locking section 612 is locked with the first end 71 of the coil spring 7 and the second-locking section 51B is locked with the second end 72, and thereby, the neutral condition is established. Next, the first-turning member 61 is made rotated with respect to the first support 51 in the clockwise direction (i.e., the direction that is opposite to the biasing direction of the coil spring 7) in FIG. 3. As shown in FIG. 3B, the engaged part 613 and the engaging part 51C are engaged with each other so that the engaging condition is established and thereby, the rotation movement in the biasing direction of the first-turning member 61 is made restricted by both the engaged part 613 and the engaging part 51C. That is, the initial biasing force is imparted to the coil spring 7, and the initial biasing force is maintained.

Next, while the first-turning member 61 is assembled to the corrugate tube 4 (wire harness 41), the boss 61C is inserted into the boss-receiving hole 62C, the protruding piece 61D and the protruding-piece-receiving portion 62D are made engaged with each other, and the lib 62E is inserted into the lib-receiving groove. Further, the first-turning member 61 is assembled to the second-turning member 62, the insertion portion 63 fabricated thereby is further made to retain the corrugate tube 4, and the wire harness 41 is made inserted thereinto. Further, the first support 51 is assembled to the second support 52 so that the corrugate tube 4 (wire harness 41) is routed as shown in FIG. 4A, maintaining the engaging condition as shown in FIG. 3B. Thereby, the body-side unit 2 is fabricated. The body-side unit 2 is securely mounted on an arbitrarily determinable portion in the motor vehicle body B.

Figure 5:
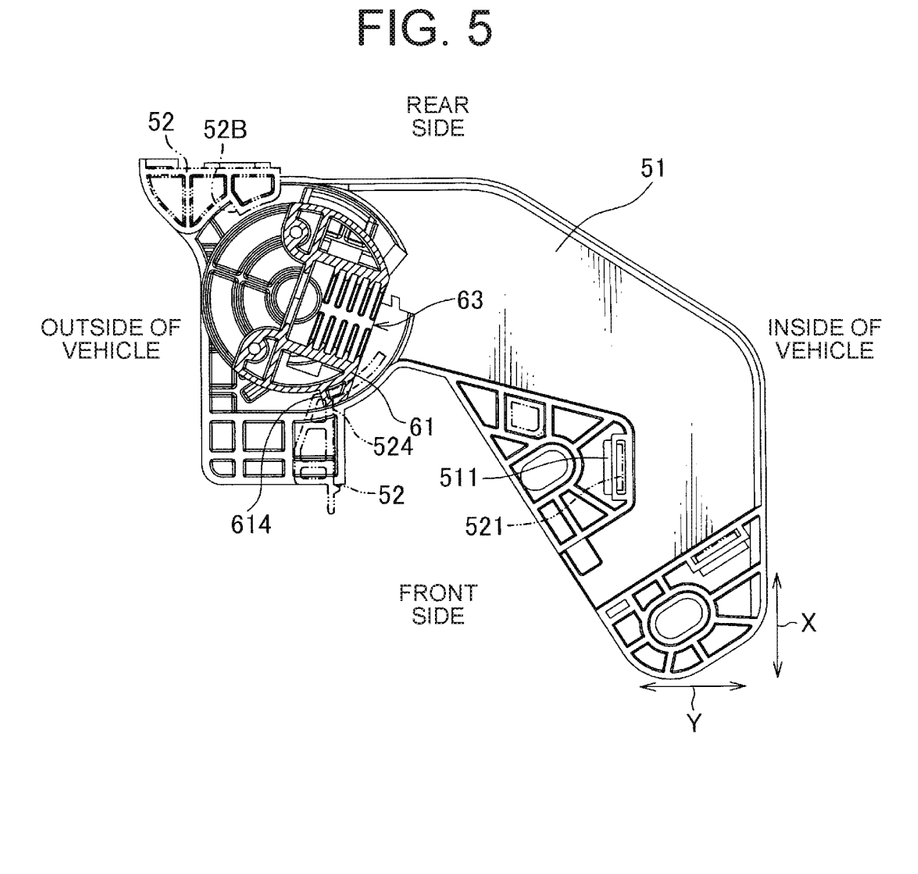
FIG. 5 is a partial sectional view showing an assembly process of the power-supplying device.

Here, the relationship between the turning member 6 and the second support 52 is described. The second support 52 protrudes upwardly as shown in FIG. 2, and there is formed in the second support 52, a projection portion 524 for mechanically connecting to the first support 51. The projection portion 524 is formed at a substantially same location as the restricted portion 614 at the neutral condition as shown in FIG. 5. That is, before the first support 51 is assembled to the second support 52, the turning member 6 is allowed to be rotated as described above, and after the turning member 6 has been rotated, the space where the restricted portion 614 has occupied before its rotational movement was started, can be made for use as another usage. Thereby, the size of the support 5 can be reduced.

Next, the operation of the door-side unit 3 when the sliding door opens and closes is described. In the door full-closed state as shown in FIG. 1 and FIG. 4A, the body-side unit 2 is in a state where the insertion portion 63 is directed forwardly in the X-direction by means of the initial biasing force, that is, the corrugate tube 4 is supported such that it is directed forwardly in the X-direction. Further, the turning member 6 is being biased to the clockwise direction by the coil spring 7 as shown in FIG. 1 so that in the door-half-opened state where the sliding door is in halfway between the fully opened and the fully closed position, the corrugate tube 4 is bent to be formed in S-shape and the body-side unit 2 maintains the state where the insertion portion 63 is directed forwardly in the X-direction. Further, when the sliding door is furtherly opened, as shown in FIG. 4B, the turning member 6 gradually rotates in the direction that is opposite to the biasing direction so that the door-full-opened state is established as shown in FIG. 1 and FIG. 4C. In the door-full-opened state, the body-side unit 2 becomes to be in a state where the insertion portion 63 is directed towards the outside of the motor vehicle in the Y-direction, that is, the corrugate tube 4 is supported by the insertion portion 63 while being directed towards the outside of the motor vehicle in the Y-direction. Further, the abutment of the restricted portion 614 against the restricted portion 614 serves as restricting the rotational movement in the direction that is opposite to the biasing direction of the turning member 6 so as not to rotate to, or beyond the predetermined rotation position.

According to such an embodiment, such effects as the following can be obtained: the first support 51 including the engaging part 51C and the first-turning member 61 including the engaged part 613 are relatively moved in the direction that is opposite to the biasing direction so that the engaging condition is established. Thereby, the state where the initial biasing force is being imparted to the coil spring 7 is allowed to be preserved, and the first support 51 and the second support 52 can be easily assembled to each other so as to make the turning member 6 be supported thereby. Accordingly, the assembly workability can be enhanced.

Further, the first-turning member 61 and the second-turning member 62 are provided individually to each other so that the first-turning member 61 into which the wire harness is avoided to be inserted, can be selectively made supported by the first support 51, and thereafter the first-turning member 61 and the second-turning member 62 can be assembled to each other while the wire harness 41 is being inserted thereinto. Accordingly, the assembly workability can be furtherly enhanced.

Further, in first-turning member 61, there is formed the restricted portion 614, and in the second support 52, there is formed a restriction portion 52B, thereby, the working range of the corrugate tube 4 can be restricted. Further, the restriction portion 52B is formed in the second support 52, thereby, it can be prevented that the restriction portion 52B becomes to be an impediment when the first-turning member 61 is being supported by the first support 51 so that the engaging condition is changed from the neutral condition.

Further, both the first-locking section 612 and the engaged part 613 are formed in the projection portion 611, thereby, the configuration of the first-turning member 61 can be more simplified as compared to the configuration in which the first-locking section 612 and the engaged part 613 are formed individually to each other.

Meanwhile, the present invention is not limited to the above-described embodiments and is designed to include the other features capable of achieving the objectives of the present invention. For example, such modifications as the following are also within the scope of the present invention: further in the above-embodiment, although the first-turning member 61 and the second-turning member 62 are provided individually to each other, the first-turning member 61 and the second-turning member 62 may be provided in an integral manner so that the number of the components is made reduced according to this configuration.

Further, although in the embodiment, the restricted portion 614 is formed in the first-turning member 61 and the restriction portion 52B is formed in the second support 52, the restricted portion may be formed in the second-turning member 62, or, the restriction portion may be formed in the first support 51. Further, the restricted portion 614 and the restriction portion 52B can be omitted, for example, by appropriately setting the biasing force of the coil spring 7 or the rigidity of the corrugate tube 4, the rotational movement of the turning member 6 in the direction that is opposite to the biasing direction may be restricted so as not to rotate to, or beyond a predetermined rotation position and thereby, the working range of the corrugate tube 4 is made restricted.

Further in the above embodiment, although both the first-locking section 612 and the engaged part 613 are formed in the projection portion 611 protruding radially and outwardly, the first-locking section 612 and the engaged part 613 may be provided individually to each other. According to such a configuration, the engaging part can be formed in an arbitrarily determinable positon in the first support 51. Further, the engaged part may be formed in a concave shape inwardly in the axial direction of the shaft, and the engaging part may be protruded inwardly in the axial direction of the shaft.

Further in the above embodiment, although the secondary shaft 62A is designed to protrude downwardly in the Z-direction, a shaft protruding upwardly may be formed in the second support 52 and the secondary shaft may be formed in a concave shape so that the secondary shaft is supported by the second support 52.

Further in the above embodiment, although the support 5, the turning member 6, and the coil spring 7 in the body-side unit 2 are exemplified, substantially the same configuration as this can also be adopted in the door-side unit 3.

Further in the embodiment, although the power-supplying device 1 is designed to be provided in a motor vehicle, it may also be provided in a ship, an airplane, or the like. Another device may be adopted insofar as it supplies electric power via the wire harness 41 between a fixing structure and the slide-structure body that is provided slidably in the fixing structure.

Although the best modes of configuration as well as method for implementing the present invention have been disclosed in the above descriptions, the present invention is not limited thereto. That is, the present invention is specifically illustrated in the drawings and described mainly with regard to specified embodiments, the person in the pertinent art can arbitrarily modify or alter the shapes, the materials, the number of pieces, or can implement variants created in other detailed features with respect to the above-described embodiments. Consequently, the descriptions with regard to the limitations of the shapes, the materials or the like as disclosed in the above have been exemplified in order to make the present invention more understandable, thus, these are not intended to limit the scope of the present invention. Accordingly, the descriptions by a limited part of the shape or the materials, or by the name of the members without having the whole limitations thereof are, without saying, within the scope of the present invention.

REFERENCE SIGNS LIST

1 power-supplying device
5 support
6 turning member
7 coil spring
51 first support
52 second support
61 first-turning member
62 second-turning member
71 first end
72 second end
51B second-locking section
51C engaging part
52B restriction portion
61A primary shaft
611 projection portion
612 first-locking section
613 engaged part
62A secondary shaft

The invention claimed is:

1. A power-supplying device comprising:
a support that is to be affixed to a sliding door or a vehicle body;
a turning member pivotally supported by the support and into which a wire harness is inserted; and
a coil spring, located between the support and the turning member, adapted to bias the turning member in a predetermined rotation direction,
wherein the turning member includes:
a primary shaft protruding at one end thereof in an axial direction,
a secondary shaft formed at another end thereof in the axial direction, and
a projection portion formed adjacent to the primary shaft at the one end of turning member, the projection portion being provided with:
a first-locking section, located on one side of the projection portion, adapted to be locked with a first end of the coil spring, and
an engaged part, located on an other side of the projection portion, that is to be engaged with the support,
wherein the support includes a first support supporting the primary shaft and housing the coil spring, and a second support affixed to the first support and supporting the secondary shaft,
wherein the first support includes a second-locking section to be locked with a second end of the coil spring and an engaging part to be engaged with the engaged part of the projection portion on the turning member,
wherein by moving the first support relative to the turning member in a direction that is opposite to the biasing direction of the coil spring from a neutral condition in which the primary shaft is supported by the first support, the first end of the coil spring is locked with the first-locking section and the second end thereof is locked with the second-locking section, an engaging condition in which the turning member's rotation towards the biasing direction is restricted, the coil spring is elastically deformed, an initial biasing force is imparted and maintained, and the engaging part and the engaged part are engaged with each other, is established, and the first support and the second support are made assembled to each other, and
wherein the turning member is composed of a first-turning member including the entire primary shaft and the entire projection portion and a second-turning member including the entire secondary shaft.

2. The power-supplying device as defined in claim 1, wherein the second support includes a restriction portion that restricts a rotational movement in a direction that is opposite to the biasing direction of the turning member so as not to rotate to or beyond a predetermined rotation position.

3. The power-supplying device as defined in claim 2, wherein the projection portion protrudes radially and outwardly with respect to the axial direction of the primary shaft of the turning member.

4. An assembly method of the power-supplying device as defined in claim 3, comprising:
- a step of relative movement of the first support with respect to the turning member in a direction that is opposite to the biasing direction from the neutral condition to establish the engaging condition,
- assembling the wire harness to the turning member in the engaging condition, and
- subsequently, assembling the first support and the second support to each other.

5. An assembly method of the power-supplying device as defined in claim 2, comprising:
- a step of relative movement of the first support with respect to the turning member in a direction that is opposite to the biasing direction from the neutral condition to establish the engaging condition,
- assembling the wire harness to the turning member in the engaging condition, and
- subsequently, assembling the first support and the second support to each other.

6. The power-supplying device as defined in claim 1, wherein the projection portion protrudes radially and outwardly with respect to the axial direction of the primary shaft of the turning member.

7. An assembly method of the power-supplying device as defined in claim 6, comprising:
- a step of relative movement of the first support with respect to the turning member in a direction that is opposite to the biasing direction from the neutral condition to establish the engaging condition,
- assembling the wire harness to the turning member in the engaging condition, and
- subsequently, assembling the first support and the second support to each other.

8. An assembly method of the power-supplying device as defined in claim 1, comprising:
- a step of relative movement of the first support with respect to the turning member in a direction that is opposite to the biasing direction from the neutral condition to establish the engaging condition,
- assembling the wire harness to the turning member in the engaging condition, and
- subsequently, assembling the first support and the second support to each other.

\* \* \* \* \*